United States Patent Office 3,406,515
Patented Oct. 22, 1968

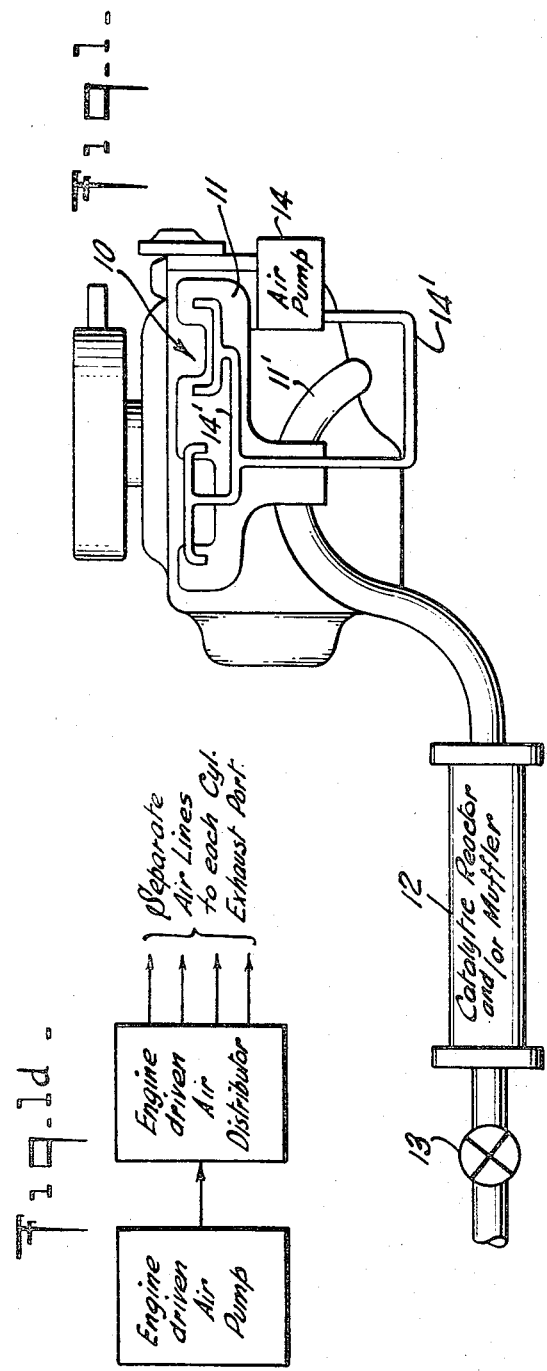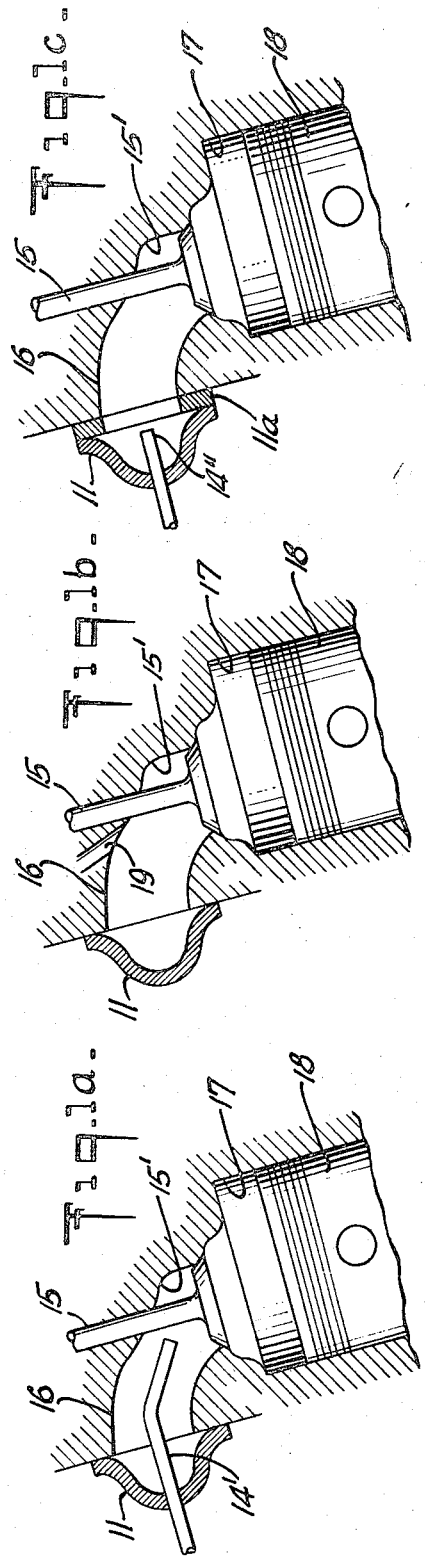

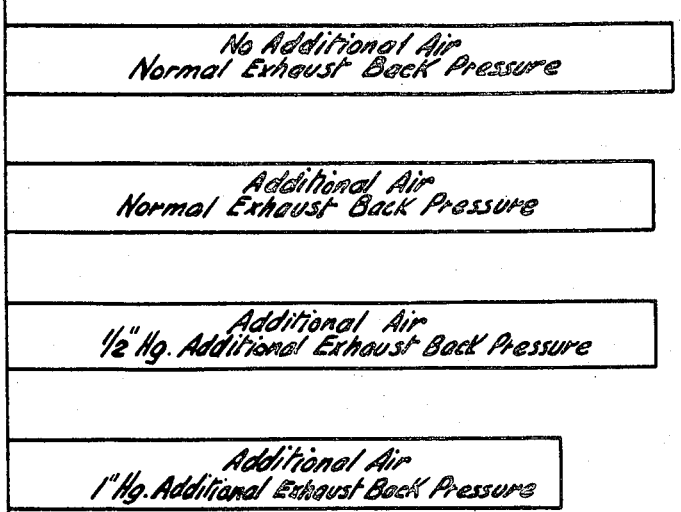
Fig. 2. Effect of adding Air to Exhaust Port and increasing Back Pressure on idle Fuel Consumption
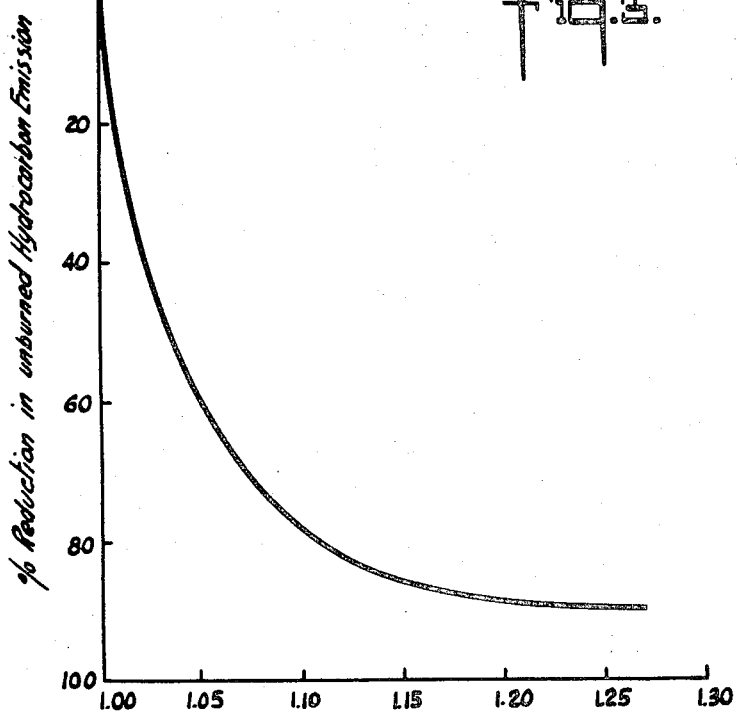
Fig. 3.

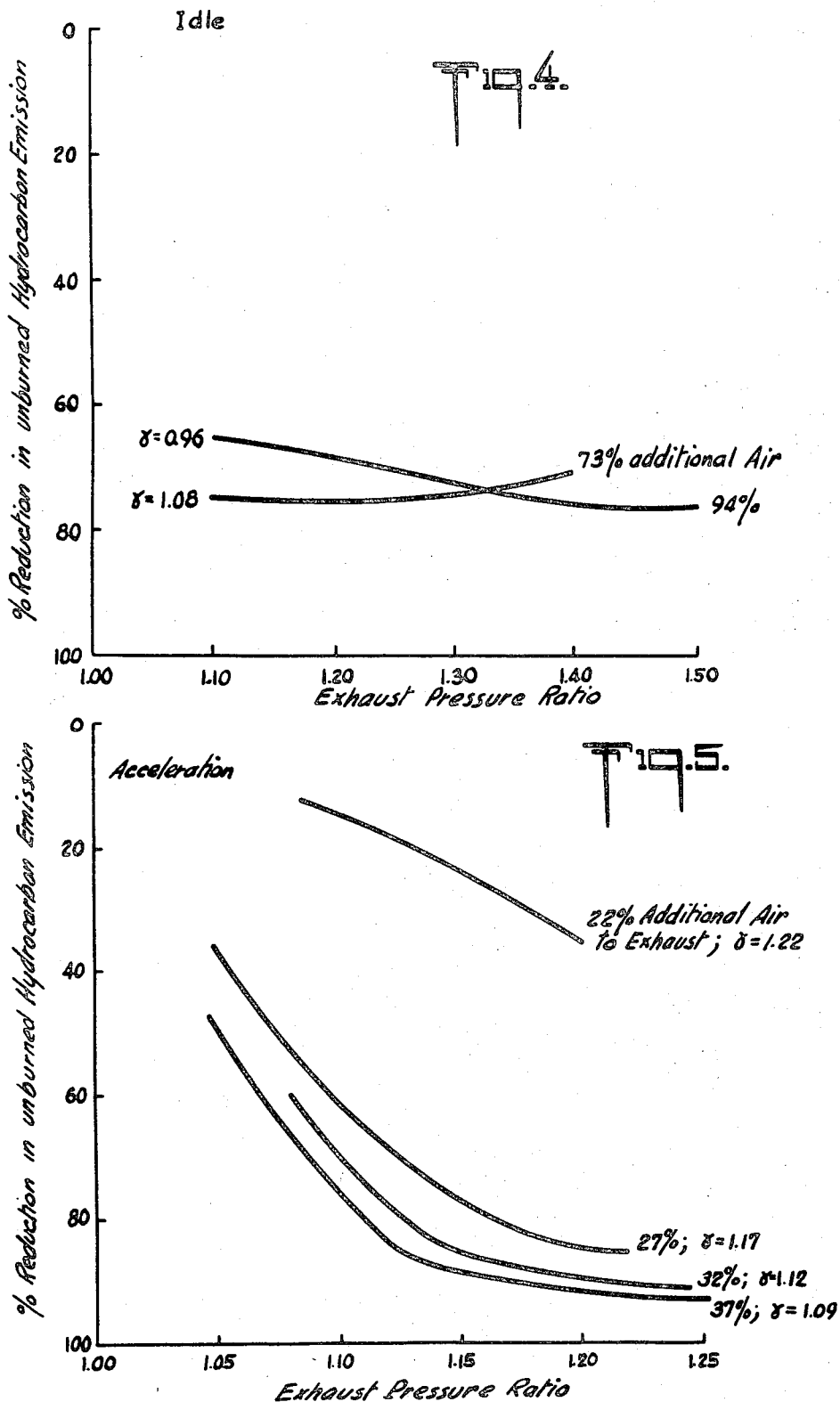

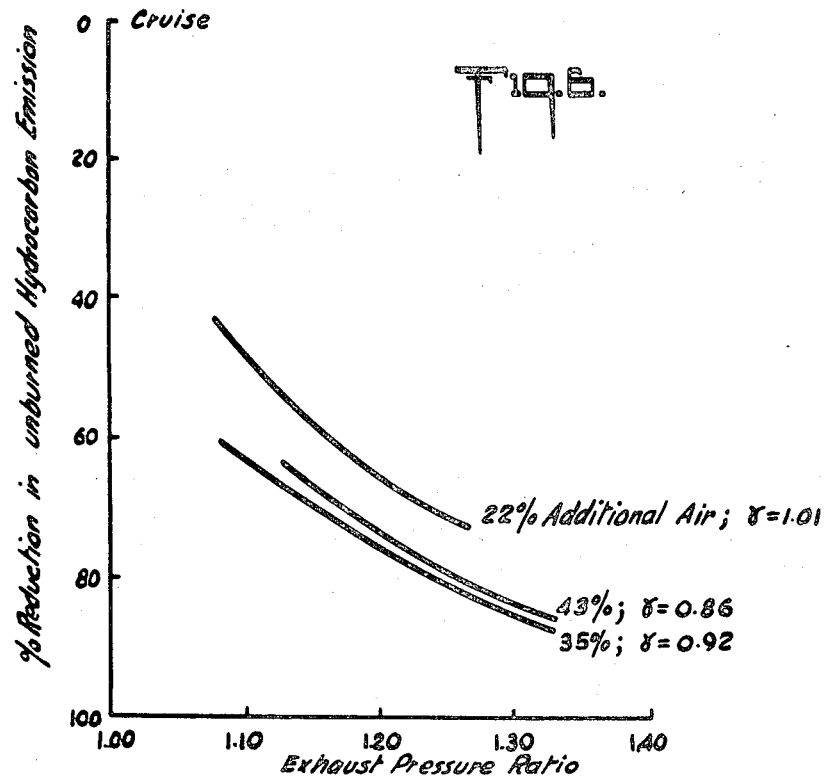
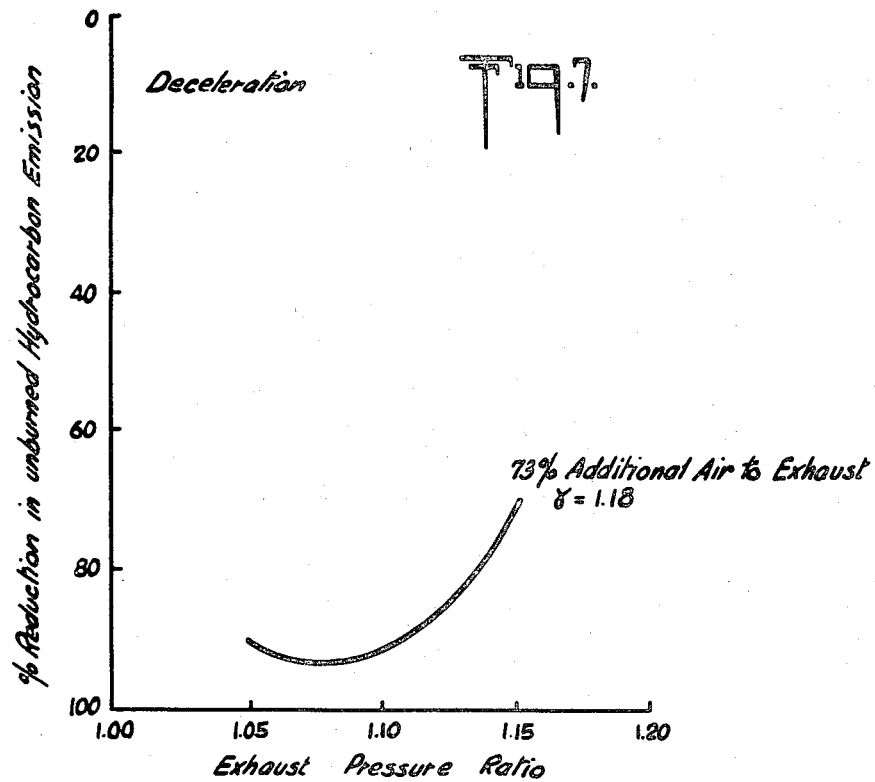

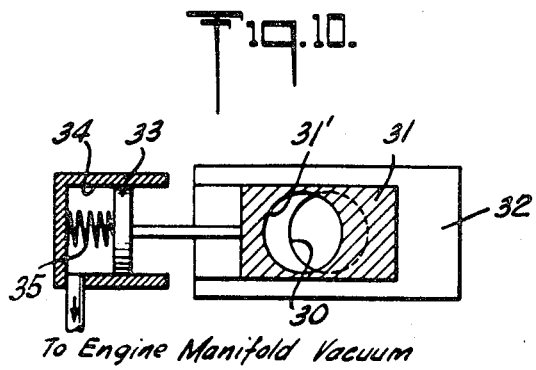
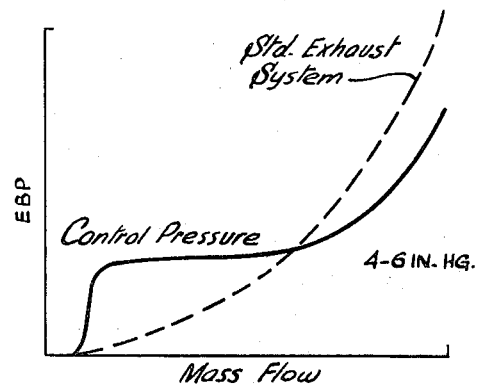
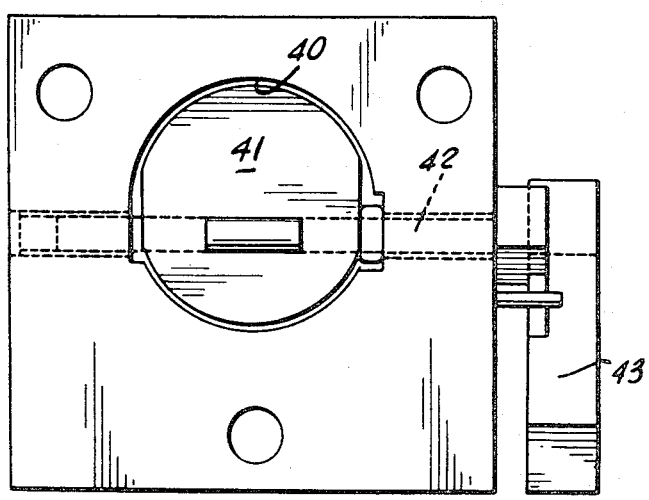
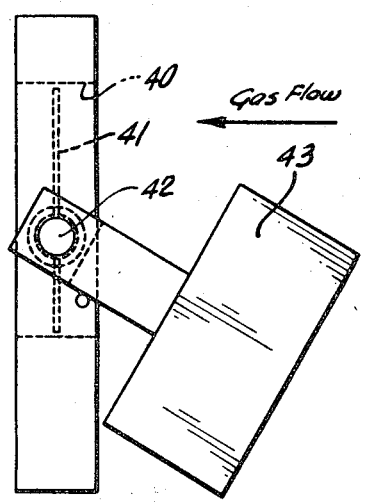
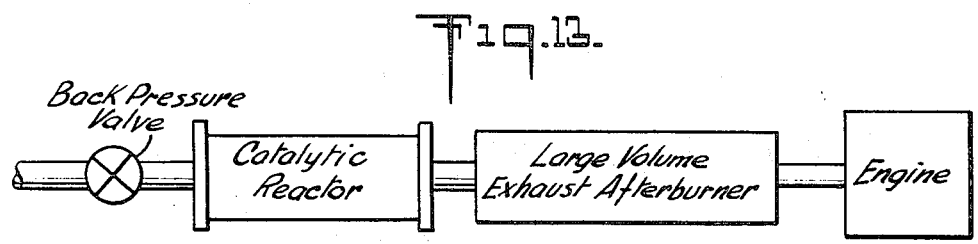

3,406,515
INTERNAL COMBUSTION ENGINE SYSTEM FOR EXHAUST EMISSIONS CONTROL
Milton D. Behrens, Hopewell Junction, N.Y., assignor to Texaco Inc., New York, N.Y., a corporation of Delaware
Continuation-in-part of application Ser. No. 119,571, June 26, 1961. This application Jan. 2, 1964, Ser. No. 335,122
20 Claims. (Cl. 60—30)

This application is a continuation-in-part of application, Ser. No. 119,571, filed June 26, 1961, now abandoned.

This invention relates generally to the operation of internal combustion engines, and in one specific embodiment, to a method and apparatus for eliminating combustible compounds from the products of combustion of an internal combustion engine, especially at low load conditions, and thereby improving the operation of such engines.

Internal combustion engines generally operate at fuel-air mixtures which are richer than stoichiometric, with the result that in the exhaust products of combustion, there are considerable residual combustible compounds including carbon monoxide, hydrogen and hydrocarbons. For automotive exhaust emissions control, it is known that additional air should be added to such exhaust products to produce an overall fuel-air ratio in the exhaust system at least stoichiometric and preferably slightly leaner, and means must be provided for promoting the reaction of the combustible compounds in the exhaust with air to the eventual end products of water and carbon dioxide.

The introduction of air as an oxidizing fluid into the exhaust manifolds of internal combustion engines to convert the carbon monoxide in the engine exhaust products to carbon dioxide is known in the art. Such an oxidizing fluid is introduced adjacent the downstream face of the exhaust valve, where the temperature is sufficiently high so that further combustion can occur spontaneously. Means are also known for mixing and reacting additional air with the combustible compounds in the exhaust products in the form of catalytic reactors.

Accordingly, it is an object of my invention to provide an improved means for greatly reducing, if not eliminating for all practical purposes, combustible compounds in the exhaust products of combustion from an internal combustion engine.

It is another object of my invention to provide an improved method for controlling the amount of combustible materials in the exhaust products of combustion of an internal combustion engine.

Still another object of my invention is to provide a simple but effective structure for an automatic exhaust emissions control system in an internal combustion engine for the exhaust products of combustion thereof.

These and other objects, features and advantages of the invention will become apparent from the following description, and claims when read in conjunction with the accompanying drawings wherein:

FIG. 1 is a diagrammatic showing of an apparatus employing my invention;

FIGS. 1a, 1b and 1c are alternate ways of providing additional air adjacent and downstream an exhaust port;

FIG. 1d is a diagrammatic showing of an alternate apparatus for providing additional air employing separate air lines from a distributing manifold;

FIG. 2 is a graphical exposition of the increase in fuel consumption efficiency resulting from the provision of additional air adjacent an exhaust port and elevating the back pressure, at engine idling condition;

FIG. 3 is a general graphical showing of the importance of elevated exhaust back pressure in promoting the exhaust system burning reaction;

FIGS. 4, 5, 6 and 7 are graphs illustrating at idle, acceleration, cruise and deceleration conditions respectively, the effect of elevated exhaust pressure ratio on the percentage reduction of unburned hydrocarbons in the exhaust;

FIG. 10 is a diagrammatic disclosure of a valve operated by intake manifold vacuum to elevate the exhaust back pressure;

FIGS. 11a and 11b are front and side diagrammatic elevations of a butterfly valve, mounted off-center, which can be used to control the exhaust back pressure;

FIG. 12 is a graphical showing of the back pressure valve regulating characteristics; and FIG. 13 is a block diagram of an apparatus utilizing my combined system.

Figure 8:
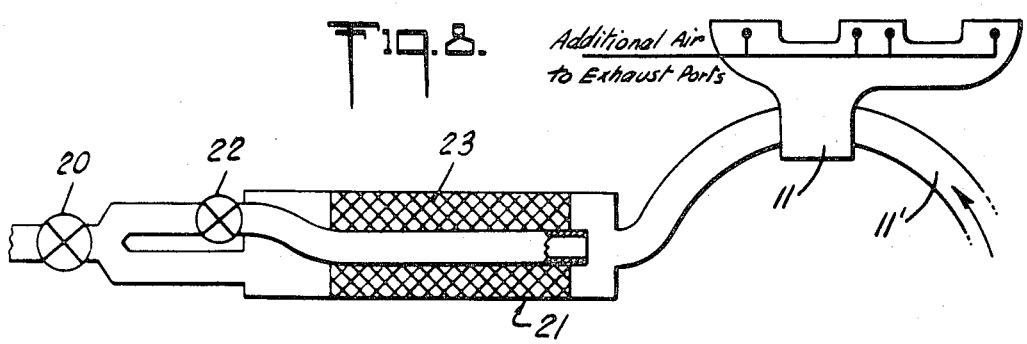
FIG. 8 is a diagrammatic showing of an alternate structure for reducing pollutants in exhaust products of combustion utilizing a catalyst.

The objects of my invention are achieved basically by introducing additional air into the exhaust gases of an internal combustion engine for further reaction with the products of combustion exhausted therefrom and promoting the reaction of air and the residual combustibles therein by raising the exhaust back pressure. Additional reaction is obtained by using a catalytic reactor and a large volume exhaust system afterburner.

An engine driven pump has been found feasible for providing additional air to the engine exhaust system. The additional air and exhaust products of combustion are delivered to a chamber where their mixing and combustion occur. In non-catalytic combustion types of the prior art, such a chamber is known as a direct flame afterburner where ignition is initiated by positive means, such as a glow plug or a spark plug. In certain cases, it may be necessary to provide additional fuel-air mixture in order to maintain a minimum temperature in the afterburner to effect the desired combustion of the carbon monoxide and hydrocarbons in the engine exhaust system. In this respect, the extra fuel increases the expense of the operation of the afterburner.

Catalytic reaction chambers or reactors are characterized by the features that (a) a catalyst is impregnated on a ceramic or refractory base in the form of bricks, spheres, pellets or porous material, and (b) the exhaust gases plus additional air to complete the combustion thereof are introduced into the reaction chamber packed with the catalyst for mixing and reacting as they pass over and through the catalyst bed. The principal advantages of the catalytic reactor over the direct flame afterburner are the lower reaction temperatures (600–1000° F. as against 1400° F. and higher) and the elimination of the extra fuel consumption. Some disadvantages are that the typical catalytic reactor is large and may contain up to 50 pounds of a catalyst impregnated ceramic, so that with such a large thermal mass, a relatively long time of start-up operation (up to 15 minutes) is needed to warm up the catalyst to its activation temperature; and while some catalysts may resist lead poisoning, they tend to break up and become ineffective because of combined thermal and mechanical shocks from "stop and go" driving and fluctuating load characteristics of automotive service, and from pulsating gas flow and mechanically induced vibrations. Also, deposits from the products of combustion may coat the catalyst and so impair its action.

Referring to FIG. 1 of the drawings, there is disclosed the general showing of an apparatus or engine system wherein the invention is used, consisting basically of an internal combustion engine at 10, with an exhaust system including an exhaust manifold at 11, leading to a muffler and/or catalytic reactor structure indicated at 12. There is disclosed at 13, a diagrammatic showing of a valve for regulating exhaust back pressure, shown located downstream of the muffler and catalytic reactor structure. The location of this valve is determined in accordance with the design characteristics of the engine employing my invention, in order that proper afterburning may be completed in the exhaust system. At 14, there is disclosed an engine driven air pump for providing additional air to the exhaust system of the engine, in the manner shown specifically in FIG. 1a, through inlet tubing 14'. When delivery characteristics are adequate, an exhaust driven turbine super-charger may be used to supply the additional air. Other means for introducing additional air into the exhaust system adjacent an exhaust port are shown in FIGS. 1b and 1c.

As known in the art, additional air is provided adjacent the downstream face of the exhaust valve 15, FIG. 1a, which closes the exhaust port at 15' in the cylinder head 16 of an internal combustion engine, having a cylinder located at 17 and a piston therein at 18. It is evident that with the inlet tubing 14' passing through the exhaust manifold indicated at 11, there is some preheating of the additional air. Preheating of the additional air may be accomplished in other ways, e.g. by cooling of engine locations subject to overheating, and could be used when engine characteristics suggest that the additional air be introduced at higher than ambient temperatures. The pipe at 11', FIG. 1, leads from the exhaust manifold of the other bank of engine cylinders, as in the case of V-type engines, and brings along the exhaust gases and additional air in various stages of reaction.

In FIG. 1b, the additional air is introduced through passageways 19 in the cylinder head 16 adjacent an exhaust port and are formed to direct the additional air into the very hot exhaust gases downstream of the exhaust port.

FIG. 1c discloses a modification of FIG. 1a, with the end of the tubing at 14'' projecting through the manifold to direct additional air toward the exhaust port. Such a construction would most aptly be used in the case of fitting into older vehicles as contrasted with the structure of FIG. 1a, which would be original car equipment.

FIG. 1d discloses a system in block form comprising an engine driven air pump, an engine driven air distributor, and individual air lines to each cylinder exhaust port. The functions of the air pump and air distributor can be combined if convenient and practical. The air pump delivers air under pressure to the air distributor, which in the simplest case, meters a fixed amount of air to each exhaust port at a crank angle which corresponds to the time of exhaust valve opening and/or later. At 20 p.s.i. and 100° F. air supply, the air distributor would have to meter approximately 1.0 cubic inch of air to each exhaust port at each firing. The size of the distributor therefore need not be very large.

In the area of air introduction, the temperatures of the exhaust gases vary from 1400° F. to 2400° F., depending upon engine operating conditions, so that in the presence of additional air, the combustible compounds in the products of combustion can ignite spontaneously. At low and medium load conditions, it has been found that to promote a more complete combustion of the residual combustibles, additional back pressure must be imposed on the gases in the exhaust system in addition to that imposed by the conventional muffler and/or catalytic reactor construction. Normally, the exhaust back pressure imposed by the conventional muffler structure at engine idling conditions may amount to approximately 0.5 p.s.i., and under conditions of wide open throttle operation (at approximately 70 m.p.h. and higher) may amount generally to as much as 10 p.s.i., due largely to the large mass volume of gases, as well as to their inertia, passing through the muffler.

To achieve the improved afterburning conditions, as a generalization, the excess back pressure should be greater than that imposed by the ordinary muffler construction, and should be greater than 1.05 times the atmospheric pressure to attain at least minimum control standards of reduction of hydrocarbon content. The slight power loss incurred because of the elevated back pressure is more than compensated for by increases in fuel economy which accrue from the use of additional air at the exhaust port plus an elevated exhaust back pressure. As an example, FIG. 2 discloses the reduction in fuel consumption from such use at engine idle condition. Note that some efficiency is lost when there is a slight elevation in exhaust back pressure but that the gain (i.e. reduction in fuel consumption) is about 17% when the exhaust back pressure has been raised by one inch of mercury.

Presently, certain requirements for reducing pollutants contributing to air pollution include that the hydrocarbon content of the average auto exhaust be cut 80% from 1,375 to 275 p.p.m., and carbon monoxide content from 3.8% to 1.5%. It is known also that in the after-burning process, the carbon monoxide and hydrogen in the exhaust products of combustion are oxidized usually prior to the hydrocarbons. FIG. 3 is a graphical showing of the percentage reduction in unburned hydrocarbon emission plotted against the exhaust pressure ratio of the absolute exhaust back pressure with respect to atmospheric pressure, based on an approximate composite exhaust sample. To meet a present statutory requirement for reduction of hydrocarbon pollutants by 80%, it is found that the exhaust pressure ratio is about 1.1 or roughly, that the excess back pressure should be about ⅛ greater than the atmospheric pressure. The percent reduction is a function of the original quantity of pollutants in the products of combustion, depending on the fuel-air mixture, e.g. for an engine running on a lean mixture, only a 30–40% reduction may be necessary. If only the minimum statutory requirement limit of 275 p.p.m. of hydrocarbons were desired to be met, an exhaust pressure ratio of 1.05 will be sufficient.

FIGS. 4, 5, 6 and 7 are graphs illustrating the effect of elevated exhaust back pressure in promoting the exhaust system afterburning reaction, with the percentage reduction in unburned hydrocarbon emission being plotted against the exhaust pressure ratio, and the ratio of the actual fuel-air mixture to the stoichiometric fuel-air mixture for each curve being indicated as $\gamma$ at idle, acceleration, cruise and deceleration conditions respectively, as the value of $\gamma$ varies from about 0.85 to about 1.25. The addition of air is continuous and is provided the exhaust system at a pressure sufficient for free flow thereto. Too great an amount of additional air leads to lowering of the temperature in the exhaust system so that the extent of additional burning is decreased and the cost of pumping is increased. When necessary, the additional air can be preheated, too.

FIG. 4 is a good example showing the effect of having an excess of additional air. In particular, when 94% additional air was added and with a γ ratio of 0.96, the exhaust pressure ratio had to be increased from 1.10 to 1.40 before the reduction in unburned hydrocarbons emission was appreciable. At the higher pressure ratio, the excess additional air was sufficient in quantity so as to result in a reduction in hydrocarbon emission. When 73% addition air was introduced at a γ ratio of 1.08, the percentage reduction showed a decrease, because the more efficient exhaust pressure ratio had been exceeded and should not have been more than about 1.25.

FIG. 5 shows the improved effects during acceleration as the amount of additional air is increase with an increase in exhaust pressure ratio, and as the value of γ approaches unity, the reduction effects are more pronounced; also, that at a given value of γ, the reduction effects increase with increased exhaust pressure ratio.

FIG. 6 shows a reversal in effects between the addition of 35% and 43% more air. This is explained by the fact that the optimum amount of additional air is approximately 35% and further additional air will tend to lower the temperature in the exhaust system and hinder further afterburning reaction.

FIG. 7 shows a single exemplary curve of effects during deceleration, with maximum reduction in unburned hydrocarbons when the pressure ratio is approximately 1.075. Idling and deceleration conditions are critical as shown by the types of curves in FIGS. 4 and 7.

Figure 8A:
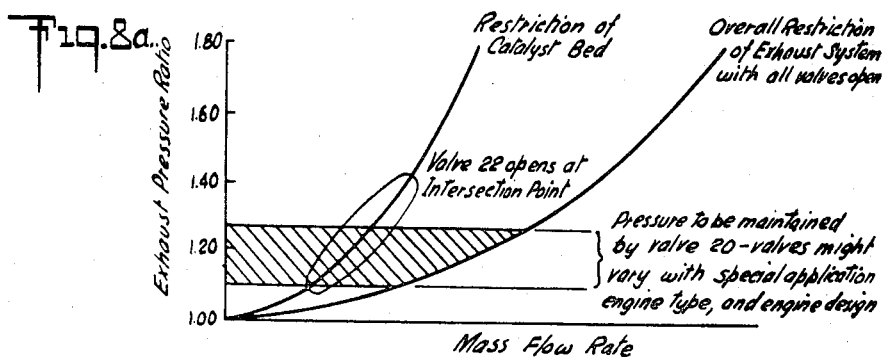
FIG. 8a is a graphical illustration of the automatic operation of the structure disclosed in FIG. 8.

While the content of the combustible compounds in the exhaust products of combustion can be removed satisfactorily to meet the minimum conditions set by certain present ordinances, it is possible to reduce further the unburned hydrocarbons by the use of a catalyst positioned in or adjacent the muffler for a further afterburning reaction. Such a catalyst could provide not only for the reduction of the hydrocarbon content but also control the amounts of other gases, such as the oxides of nitrogen, which are included in the noxious materials leaving the exhaust system afterburning reaction. After the introduction of additional air into the exhaust system adjacent an exhaust port, the elevated temperature following the combustion reaction in the exhaust system permits the amount of catalyst required in the reactor to be reduced, and because of the increased temperature of the exhaust gases, the load on the catalyst in the reactor is reduced also. To achieve such results, FIG. 8 discloses diagrammatically a structure by which the exhaust back pressure is maintained at the required level to promote the exhaust system afterburning, with the valve at 20 to control the pressure of the exhaust gases flowing through the coupled catalytic muffler construction, indicated generally at 21 and joined to the exhaust manifold 11, and the valve at 22, which opens when the pressure drop across the catalyst 23 equals the pressure being maintained by the valve at 20 and also opens when the temperature in the catalyst exceeds approximately 1600° F. The positions of the valves are exemplary and other valve positions and/or structure can be used to perform the functions of valves 20 and 22. In this manner, the life of the catalyst can be extended and one of the more expensive components of the afterburner construction is protected. FIG. 8a gives a graphical illustration of the automatic operation of the system disclosed in FIG. 8, with exhaust pressure ratio plotted against mass flow rate.

The catalytic muffler 21, is connected to the exhaust manifold 11 as close as possible to the exhaust ports in order to take advantage of the higher temperature of the exhaust gases in this region, for better catalytic reaction. The construction of the catalytic muffler can be such so that not only would the catalyst serve as a muffler but also would provide sufficient resistance to gas flow to raise the exhaust back pressure and so require a different type back pressure valve (as shown at 20) or might eliminate the need for the same depending upon the normal schedule of engine operations; and the bypass flow of exhaust gases (when valve 22 is open) is through the surrounding catalyst, in order that the latter may be kept heated for prompt reaction should valve 22 close, thus cutting off the by-pass flow.

Figure 9:
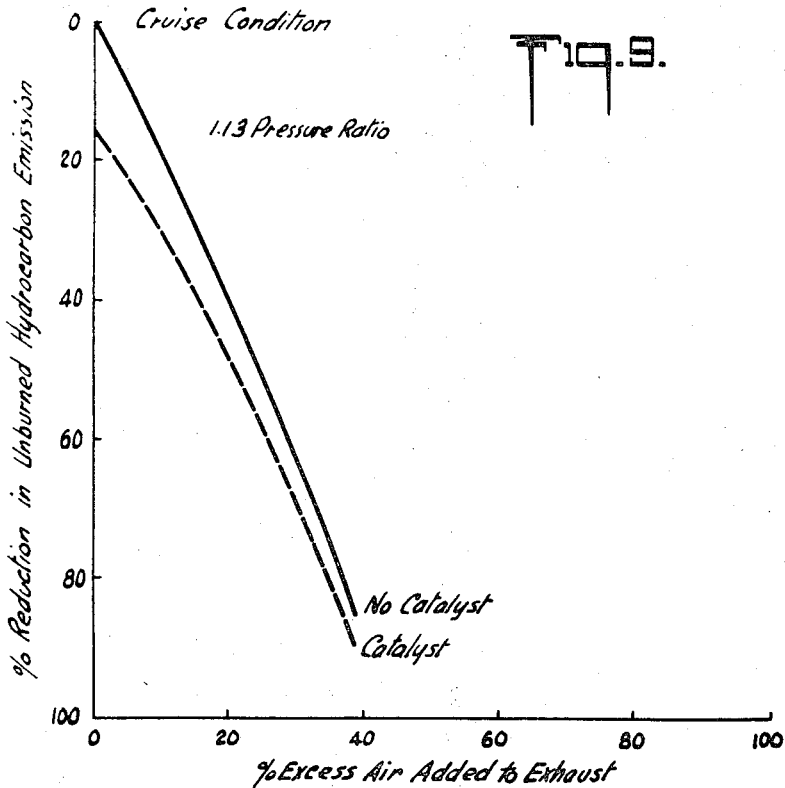
FIG. 9 is a graphical showing of the additional reduction in unburned hydrocarbons when the structure of FIG. 8 is used.

For a graphical showing of typical additional reduction in unburned hydrocarbon emission in the exhaust at cruise condition, reference is made to FIG. 9, without further explanation thereof.

Specific valve constructions to maintain proper back pressure conditions in the exhaust system are disclosed in FIGS. 10 and 11a and 11b, with regulating characteristics as shown in FIG. 12.

FIG. 10 is a diagrammatic disclosure of a valve responsive to intake manifold vacuum. At idle and light load conditions, when the exhaust back pressure is normally quite low, and the intake manifold vacuum is high, the valve will partially close the exhaust passage to increase the exhaust back pressure to a desired value. At wide open throttle when exhaust back pressure has risen and the intake manifold vacuum has dropped off, the return spring will open the slide valve thereby offering an unrestricted exhaust flow passage to the muffler and thus provide normal exhaust back pressures. In FIG. 10, the exhaust passage is indicated at 30, which is partially closed by the slide valve 31 having the opening 31' therein. The slide valve is positioned in the valve holder 32 and is joined by a rod to a guide piston at 33 housed in the vacuum chamber 34, which is connected to the intake manifold vacuum. The return spring 35 is housed in the vacuum chamber, being retained in position by the valve piston 33, and serves to counteract the forces exerted by the intake manifold vacuum. The size of the vacuum piston, the return spring rate, and slide valve opening configuration will determine the exhaust back pressure characteristics obtained by this device.

FIGS. 11a and 11b disclose a back pressure valve controlled by weights and/or constant torque springs, and consists basically of an eccentrically mounted butterfly valve. As shown in these figures, the exhaust passage 40 is closed by the valve 41 mounted off-center and supported by hinge pintle 42 and on which is mounted at one end thereof, a weight 43 serving to keep the valve 41 in passage closing position. As the exhaust gases flow down the passage, sufficient force is exerted to overcome the closing force of the weight and so will open the butterfly valve. A compensating spring may be used in place of or in conjunction with the weight to provide opposing force to gas pressures acting on the off-center mounted butterfly valve.

Alternatively, a planar spiral spring (not shown) which supplies constant torque could be substituted for the control weights and springs and would provide sufficient damping to the valve.

FIG. 12 discloses that the automatic back pressure valve providing 4–6 inches Hg back pressure on the exhaust system is desirable for operation at speeds above idle, i.e. during those periods of low mass flow rates through the exhaust system, when the back pressure without the valve would otherwise be below the imposed control back pressure. At the higher mass flow rates at higher engine speeds, the exhaust back pressure valve is open and the normal back pressure on the exhaust system without the valve would be higher than the imposed back pressure. The lower control back pressure is due probably to the constant pressure valve acting as an orifice control, to the larger volume of the exhaust system and the porous type of catalytic muffler with less resistance to the higher mass flow rates.

No warm-up period is required for operation of the disclosed automotive exhaust emissions control system as would be required for the critical operation of a catalytic reactor construction, since proper temperatures for reaction between the exhaust products and additional air are obtained either at the exhaust ports or in the large volume afterburner adjacent the catalytic reactor immediately upon starting of the internal combustion engine.

The power loss imposed by the increase in exhaust back pressure is at a minimum and as mentioned before, is compensated for by increases in the economy of engine operation with the control construction by the use of leaner fuel-air mixtures. In addition, further fuel economies are available with the use of deceleration or fuel cut off devices, and supplying blowby or crankcase gases to the air pump intake, the latter step aiding in air pollution control, also.

To increase the afterburner reaction further, a large volume insulated exhaust manifold (11, FIG. 1) in the form of larger pockets adjacent the exhaust ports provides essentially equal residence time from each port so that a substantial part of the conversion load on the catalytic reactor is relieved. This structure insures a rapid warm-up of the catalytic reactor, and, in addition, provides catalyst over-temperature protection during periods of severe operation. Where space limitations in the engine compartment make it unfeasible to utilize a large volume exhaust manifold, the required volume for the reaction between the exhaust gases and the additional air is provided by installing a large volume exhaust system afterburner ahead of the catalytic reactor in the system as shown in block form in FIG. 13, with the exhaust being provided additional air, as in FIG. 1. This large volume insulated exhaust manifold and the large volume exhaust system afterburner make it unnecessary to resort to catalyst bypassing for protection, because afterburning in the manifold or exhaust pipe before the catalytic reactor is promoted, thereby accomplishing a higher proportion of the oxidation reaction, so that the catalytic reactor has less work to perform, thereby preventing overheating of the catalyst at higher speeds. An economic construction to increase the volume of the exhaust manifold on older vehicles is disclosed at 11a, FIG. 1c, where a spacer element is inserted at the exhaust port 16 between the engine and the exhaust manifold 11. Ideal limits on the increase of the exhaust system for optimum afterburner reaction require that the ratio of the sum of the volume of the insulated exhaust manifold and the volumes of the exhaust passages leading thereto to the engine displacement range from 0.7 to 2.0, and that the ratio of the enlarged exhaust system from the exhaust valve, when in closed position, up to the catalytic reactor to the engine displacement range from 2.0 to 3.4.

The large volume exhaust system afterburner is especially advantageous for use with the smaller engines as used in present day domestic compact automobiles and where road operations are at a high engine load factor with considerable rich mixture operation and high concentrations of combustibles.

Thus there has been shown and described, a method and apparatus by which the amount of pollutant products in the exhaust of an internal combustion engine is reduced in order to comply with air pollution control requirements, as well as improving engine operations at idle and low load conditions.

The combination of air introduction closely adjacent and downstream the exhaust valves, the large volume exhaust manifold and exhaust system afterburner, a catalytic reactor and muffler structure of relatively lower resistance to higher mass flow rates, and the automatic back pressure regulating valve functioning at the lower speeds above idle to maintain a pressure higher than the normal back pressure of an exhaust system without the back pressure valve and remaining open at the higher speeds and mass flow rates at which the pressure of the exhaust system without the back pressure valve is above the pressure maintained at lower speeds all cooperate to provide a true combination which alone is capable of achieving the required reduction in hydrocarbon and CO emissions over long periods of service, as evidenced by the 12,000 mile road tests, while at the same time providing the rapid warm-up of the catalytic muffler on starting and yet preventing overheating of the catalyst above 1600° F. for any sustained period. The data appearing in the following tables substantiate such cooperation of these elements, all testing being undertaken with the addition of air adjacent the exhaust valve, except for the basic engine.

TABLE I.—VEHICLE EXHAUST EMISSION TEST DATA CALIFORNIA MVPCB PROCEDURE

| Vehicle | Basic engine | | Manifold afterburner | |
|---|---|---|---|---|
| | HC, PPMC6 [1] | CO percent | HC, PPMC6 [1] | CO percent |
| Large engine (new) [2][3] | | | | |
| Before test | 430 | 2.1 | 275 | 1.3 |
| After 12,000 miles | 485 | 3.1 | 290 | 1.6 |
| Large engine (old): After 12,000 miles | 770 | 2.5 | 325 | 1.1 |
| Small engine (compact) | | | | |
| Before test [2][3] | 635 | 5.0 | 415 | 3.0 |
| After 12,000 miles [2][3] | 775 | 6.6 | 515 | 5.0 |
| After 12,000 miles [2][4] | 890 | 4.8 | 465 | 3.3 |

California standards after 12,000 miles: HC, PPMC6 275 max.; CO, percent 1.5 max.

[1] Hydrocarbons as parts per million hexane.
[2] Equipped with positive crankcase ventilation device.
[3] Equipped with large volume reactor ahead of catalytic reactor.
[4] Equipped with large volume insulated exhaust manifold.
MVPCB=motor vehicle pollution control board.
Large Engine=394 cu. in.; small engine=144 cu. in.

TABLE II.—VEHICLE EXHAUST EMISSION TEST DATA
[California MVPCB procedure]

| Vehicle | Basic engine | | Combined system | |
|---|---|---|---|---|
| | HC, PPMC6 [1] | CO percent | HC, PPMC6 [1] | CO percent |
| Large engine (new): [2][3] | | | | |
| Before test | 430 | 2.1 | 140 | 0.6 |
| After 12,000 miles | 485 | 3.1 | 215 | 1.3 |
| Large engine (old): After 12,000 miles | 770 | 2.5 | 235 | 1.0 |
| Small engine (compact): | | | | |
| Before test [2][3] | 635 | 5.0 | 95 | 0.5 |
| After 12,000 miles [2][3] | 775 | 6.6 | 450 | 3.7 |
| After 12,000 miles [2][4] | 890 | 4.8 | 415 | 3.0 |

California standards after 12,000 Miles: HC, PPMC6, 275 max.; CO, percent 1.5 max.

[1] Hydrocarbons as parts per million hexane.
[2] Vehicles equipped with positive crankcase ventilation devices.
[3] Large volume reactor ahead of catalytic reactor.
[4] Large volume insulated manifold.

TABLE III.—EFFECT OF EXHAUST BACK PRESSURE VALVE ON VEHICLE EXHAUST EMISSION
[California MVPCB test procedure]

| Vehicle | Hydrocarbons, PPMC6 | |
|---|---|---|
| | Small engine (compact) | Large engine (old) |
| (A) Basic engine | 963 | 45 |
| (B) Engine with mechanical afterburning (MA), without exhaust back pressure (EBP) valve | 660 | |
| (C) Engine with MA with EBP valve | [1] 548 | |
| (D) Engine with MA with catalyst without EBP valve | 232 | 219 |
| (E) Engine with MA with catalyst with EBP valve | [2] 204 | [3] 177 |

[1] 17% reduction over B.
[2] 12% reduction over D.
[3] 19% reduction over D.

The combination of controlled air introduction in at least stoichiometric ratio adjacent and downstream the exhaust valves, a catalystic reactor and muffler, and an exhaust manifold or exhaust system afterburner in advance of the catalytic reactor and muffler having a volume relationship to the cubic displacement of the engine which is greater than that of normal automotive construction to afford at least 30% oxidative reduction in hydrocarbons initially present in the exhaust gases before they reach the catalytic reactor prevents overheating of the catalyst at the higher engine speeds by residual oxidative reaction in the catalytic reactor by maintaining a temperature thereof below 1600° F. for any extended period and effects reduction in the hydrocarbon content of exhaust emissions below 250 parts per million over an extended period of service.

Further, the preceding combination, coupled with an automatic back pressure regulating valve maintaining about 4–6 inches Hg back pressure on the exhaust system at lower engine speeds above idle, the normal back pressure of the exhaust system without the back pressure valve being below about 4–6 inches Hg at the lower engine speeds, the valve remaining open at higher engine speeds when the normal back pressure of the exhaust system without the valve is above the maintained back pressure, provides a further reduction of pollutants in the automotive exhaust emissions.

Other modifications and variations of the invention, as hereinbefore set forth, may be made without departing from the spirit and scope thereof, and therefore only such limitations should be imposed as are indicated in the appended claims.

I claim:

1. In an internal combustion engine having a cylinder, means for reducing the amount of residual combustibles in the products of combustion from said cylinder comprising an exhaust system leading from an exhaust port of said cylinder, means for providing air in at least stoichiometric ratio at said exhaust port for combustion of said residual combustibles among the exhaust products in said exhaust system, and means for controlling the back pressure in said exhaust system comprising valve means positioned therein downstream from said exhaust port having provisions restricting mass flow of said exhaust products at the lower speeds above idle thereby maintaining from shortly after initiation of combustion in said internal combustion engine a substantially constant back pressure higher than the normal back pressure of said exhaust system without said valve means and opening at the higher speeds and mass flow rates when said normal back pressure without said valve means is above the imposed back pressure.

2. In an internal combustion engine as defined in claim 1, said exhaust system including a large volume afterburner construction located downstream said means for providing air, and having a volume greater than that of the conventional exhaust system so that the ratio of the volume thereof to the engine displacement is in the range from 0.7 to 3.4.

3. In an internal combustion engine as defined in claim 2, said exhaust system including a catalytic reactor positioned downstream said afterburner construction.

4. In an internal combustion engine as defined in claim 1, said exhaust system including an exhaust manifold adjacent said exhaust port and having a volume greater than the normal automotive manifold construction so that the volume ratio of the sum of the volumes of said manifold and exhaust passages leading thereto to the engine displacement ranges from 0.7 to 2.0.

5. In the engine as defined in claim 1, said exhaust system including a catalytic reactor positioned adjacent and upstream said valve means.

6. In the engine as defined in claim 1, said exhaust system including a large volume afterburner construction positioned between said means for providing air and said means for elevating the back pressure in said system and comprising an insulated exhaust pipe of increased diameter over that of conventional automotive design so that the volume relationship of said exhaust system to the engine displacement is in the range from 2.0 to 3.4.

7. In an internal combustion engine as defined in claim 1, said exhaust system including a catalytic reactor and muffler, said muffler being located upstream and adjacent said reactor and having a volume greater than that of the normal muffler construction so that the volume ratio of the volume of the exhaust system up to said reactor to the engine displacement is in the range from 2.0 to 3.4.

8. A method for substantially reducing the amount of combustible compounds in the products of combustion exhausted from an internal combustion engine comprising the steps of providing to said products of combustion in the exhaust system additional air at an exhaust port of a cylinder of an internal combustion engine, and maintaining the back pressure in the exhaust system of said engine at a substantially constant pressure of at least 1.1 times atmospheric pressure soon after initiation of operation of said engine thereby promoting the reaction in said exhaust system of said additional air with combustible compounds in said products of combustion.

9. In the method as set forth in claim 8, the provision of additional air being at a rate whereby the value of $\gamma$ is in the range from about 0.85 to about 1.25, said value being the ratio of the actual fuel-air mixture in the exhaust system to the stoichiometric fuel-air mixture.

10. In combination with an internal combustion engine having an exhaust system leading from an exhaust port of a cylinder of said engine, a construction for reducing the amount of combustible pollutants in the products of combustion from said cylinder comprising means for providing air in at least stoichiometric ratio to said products of combustion in said exhaust system, and means for quickly elevating the back pressure in said system soon after the initiation of combustion in said engine and maintaining a substantially constant back pressure of at least 1.1 times atmospheric pressure, including a muffler construction having a catalyst, for promoting the reaction between said air provided said exhaust system with said combustible pollutants thereby substantially eliminating the carbon monoxide and unburned hydrocarbons in said products of combustion, said muffler construction including a muffler and valve means for controlling flow directly through said muffler, and in bypass relationship therewith through said catalyst dependent upon the pressure drop through said catalyst and the operating temperature thereof exceeding predetermined values, said valve means including an exhaust back pressure valve which is partially closed to keep the back pressure at an elevated level above that of the normal back pressure in said system without said valve when said engine is operating at the lower speeds above idle and which is opened at the higher speeds when mass flow rates are maximum when the pressure of the exhaust system without said valve is above the pressure maintaind thereby at the lower speeds.

11. In an internal combustion engine as defined in claim 1, said exhaust back pressure valve being responsive to the intake manifold vacuum whereby said valve is partially closed when said intake manifold vacuum is high and vice versa.

12. In an internal combustion engine as defined in claim 1, said valve means including an exhaust back pressure valve comprising an off-center mounted butterfly valve subject to the mass flow rate of products of combustion.

13. In an internal combustion engine as defined in claim 1, said exhaust system including an exhaust manifold adjacent said exhaust port having a volume greater than that of the conventional exhaust manifold so that the volume ratio of the total of the volume of said exhaust manifold and the exhaust passages leading thereto to the engine displacement is in the range from 0.7 to 2.0.

14. In the combination as defined in claim 10, a large volume afterburner construction positioned in said exhaust system between said means for providing air and said means for elevating the back pressure in said system.

15. A method for reducing pollutants in the products of combustion from an internal combustion engine comprising providing air in at least at stoichiometric ratio to said products of combustion from said engine, and quickly elevating the back pressure in the exhaust system of said engine soon after the initiation of combustion therein while passing air and said products of combustion through a catalyst for further reaction thereof, said back pressure being elevated and maintained at least 1.1 times atmospheric pressure substantially constant until exceeded by the normal exhaust back pressure in said exhaust system of said engine when operating at the higher speeds for promotion of the reaction involving said pollutants.

16. In the method for reducing pollutants in the products of combustion from an internal combustion engine as set forth in claim 15, the provision of air to said products of combustion from said engine being at a rate so that the ratio of fuel-air mixture in said exhaust system to the stoichiometric fuel-air mixture is in the range from about 0.85 to about 1.25.

17. In the method for reducing pollutants in the products of combustion from an internal combustion engine as defined in claim 15, the step of bypassing the flow of the mixture of air and the products of combustion through said catalyst whenever the pressure drop therethrough equals the exhaust back presure and the operating temperature exceeds a predetermined value.

18. In the method as set forth in claim 8, the step of passing the reaction products of the additional air and the products of combustion into a large volume afterburner construction.

19. In the method as set forth in claim 18, the additional step of passing said reaction products into a catalytic reactor after passing through said large volume afterburner construction.

20. In an internal combustion engine, an exhaust pipe; throttling means provided in said pipe; a suction conduit; and an operative connection between said conduit and said throttling means for regulating the throttling action in dependency on the extent of suction in said conduit during idling and during relatively low load operation of the engine so that such throttling action is a function of said suction, said operative connection comprising resilient means for transmitting motion to said throttling means.

References Cited

UNITED STATES PATENTS

| | | | |
|---|---|---|---|
| 1,789,812 | 1/1931 | Frazer | 60—30 |
| 2,217,241 | 10/1940 | Tendler | 60—30 |
| 2,263,318 | 11/1941 | Tifft | 60—30 |
| 2,295,436 | 9/1942 | Tendler | 60—30 |
| 2,667,031 | 1/1954 | Ryder | 60—30 |
| 2,771,736 | 11/1956 | McKinley | 60—30 |
| 2,851,852 | 9/1958 | Cornelius | 60—30 |
| 2,991,160 | 7/1961 | Claussen | 60—30 X |
| 2,422,024 | 6/1947 | Levy | 60—30 X |
| 2,488,563 | 11/1949 | Sills | 60—29 |
| 2,981,057 | 4/1961 | Buttler | 60—29 |
| 3,037,344 | 6/1962 | Morris | 60—30 |
| 3,059,421 | 10/1962 | Schnabel | 60—30 |
| 3,090,677 | 5/1963 | Scheitlin | 60—29 |
| 3,106,820 | 10/1963 | Schaffer | 60—30 |

RALPH D. BLAKESLEE, *Primary Examiner.*

MARK NEWMAN, *Assistant Examiner.*